(12) United States Patent  (10) Patent No.: US 9,045,227 B1
Gramling  (45) Date of Patent: Jun. 2, 2015

(54) DUAL FAN AERODYNAMIC LIFT DEVICE

(71) Applicant: William Dwight Gramling, Montoursville, PA (US)

(72) Inventor: William Dwight Gramling, Montoursville, PA (US)

( * ) Notice: Subject to any disclaimer, the term of this patent is extended or adjusted under 35 U.S.C. 154(b) by 0 days.

(21) Appl. No.: 14/299,199

(22) Filed: Jun. 9, 2014

Related U.S. Application Data

(63) Continuation-in-part of application No. 13/374,231, filed on Dec. 19, 2011, now abandoned.

(51) Int. Cl.
 *B64C 39/06* (2006.01)
 *B64C 15/02* (2006.01)

(52) U.S. Cl.
 CPC ............... *B64C 39/064* (2013.01); *B64C 15/02* (2013.01)

(58) Field of Classification Search
 CPC .... B64C 29/0008; B64C 39/00; B64C 39/06; B64C 39/062; B64C 39/064; B64C 29/02
 USPC ............................ 244/12.2, 23 R, 23 A, 23 C
 See application file for complete search history.

(56) References Cited

U.S. PATENT DOCUMENTS

| | | | | | |
|---|---|---|---|---|---|
| 1,911,041 | A | * | 5/1933 | Smyser ........................ | 244/12.2 |
| 2,075,423 | A | * | 3/1937 | Bratschie .................... | 244/23 C |
| 2,690,809 | A | * | 10/1954 | Kerry .............................. | 416/22 |
| 3,034,747 | A | * | 5/1962 | Lent ............................ | 244/23 C |
| 3,426,852 | A | * | 2/1969 | Kinsey .......................... | 416/177 |
| 3,456,902 | A | * | 7/1969 | Visconti ...................... | 244/23 R |
| 3,489,374 | A | * | 1/1970 | Morcom ...................... | 244/12.2 |
| 3,785,592 | A | * | 1/1974 | Kerruish ...................... | 244/12.2 |
| 4,117,992 | A | * | 10/1978 | Vrana .......................... | 244/23 C |
| 4,202,518 | A | * | 5/1980 | Burnham et al. ............ | 244/12.1 |
| 4,796,836 | A | * | 1/1989 | Buchelt ....................... | 244/23 R |
| 5,102,066 | A | * | 4/1992 | Daniel ......................... | 244/12.1 |
| 5,170,963 | A | * | 12/1992 | Beck, Jr. ..................... | 244/12.2 |
| 5,203,521 | A | * | 4/1993 | Day ............................. | 244/12.2 |
| 5,503,351 | A | * | 4/1996 | Vass ............................ | 244/34 A |
| 6,572,053 | B2 | * | 6/2003 | Salas ........................... | 244/12.2 |
| 6,666,403 | B1 | * | 12/2003 | Follensbee .................. | 244/12.2 |
| 7,032,861 | B2 | * | 4/2006 | Sanders et al. .............. | 244/23 A |
| 8,602,350 | B2 | * | 12/2013 | Inamori ....................... | 244/23 C |
| 2010/0294878 | A1 | * | 11/2010 | Inamori ....................... | 244/12.2 |
| 2011/0215191 | A1 | * | 9/2011 | Gramling .................... | 244/12.2 |
| 2012/0068021 | A1 | * | 3/2012 | Babinsky et al. ........... | 244/23 R |
| 2013/0062454 | A1 | * | 3/2013 | Alvarado Valverde ...... | 244/12.2 |

* cited by examiner

*Primary Examiner* — Joseph W Sanderson

(57) ABSTRACT

A two-stage fan provides efficient aerodynamic lift by concentrating and directing a generated high velocity airstream through channels and over sets of airfoils and wings which are contained within a cylindrical housing. Horizontal and vertical control is achieved by manipulating angle-of-attack of the airfoils.

11 Claims, 3 Drawing Sheets

DUAL FAN AERODYNAMIC LIFT DEVICE

CROSS-REFERENCE TO RELATED APPLICATIONS

This is a Continuation-in-Part to application Ser. No. 13/374,231

STATEMENT REGARDING FEDERALLY SPONSORED RESEARCH OR DEVELOPMENT

No Applicable

THE NAMES OF THE PARTIES TO A JOINT RESEARCH AGREEMENT

No Applicable

INCORPORATION-BY-REFERENCE OF MATERIAL SUBMITTED ON A COMPACT DISC OR AS A TEXT FILE VIA THE OFFICE ELECTRONIC FILING SYSTEM (ESE-WEB)

No Applicable

STATEMENT REGARDING PRIOR DISCLOSURES BY THE INVENTOR OR A JOINT INVENTOR

Sole Inventor filed application Ser. No. 13/374,231 on Dec. 19, 2011

BACKGROUND OF THE INVENTION (1) Field of the Invention

The invention pertains to vertical take off and landing (VTOL) aircraft.

(2) Description of Related Art Including Information Disclosed Under 37 CERF 1.97 and 37 CERF 1.98

Most prevalent of VTOL aircraft is the helicopter. Its power (horsepower) to gross weight (lbs.) ratio averages about 5 to 6 lb/hp.

The ratio of a fixed wing aircraft averages are double and in some cases, triple that of the helicopter.

In contrast, the present invention, a fixed wing VTOL aircraft, provides a high power-to-weight ratio which is imperative in the coming age of efficient battery-powered VTOL aircraft.

BRIEF SUMMARY OF THE INVENTION

The present invention generates its own relative wind with a two-stage fan, passing it over and under sets of airfoils which create lift. It is done in a manner which gives a high lift-to-horse-power ratio. For instance, ducted fan devices deliver only 2-3 lb. of lift per horsepower. Standard helicopters are somewhat better at 5-6 lb. of lift per horsepower. Fixed wing aircraft are much higher. A Cessna 182 T has 13.5 lb. of lift per horsepower, even with an inefficient airfoil compromised for cruise and slow flight. The airfoils in the present invention are positioned in a controlled and consistant airstream and thus, are optimized for maximum lift.

The present invention will deliver 8 to 15 lb. of lift per horsepower, depending on airfoil design. It provides an aircraft with the VTOL utility of helicopters without the faults such as high cost, high maintenance, limited cruise speed, and critical flight characteristics. The present invention provides a VTOL vehicle that can operate safely near obstacles such as buildings and trees and operate from areas such as automobile parking areas.

DETAILED DESCRIPTION OF THE INVENTION

Figure 1:
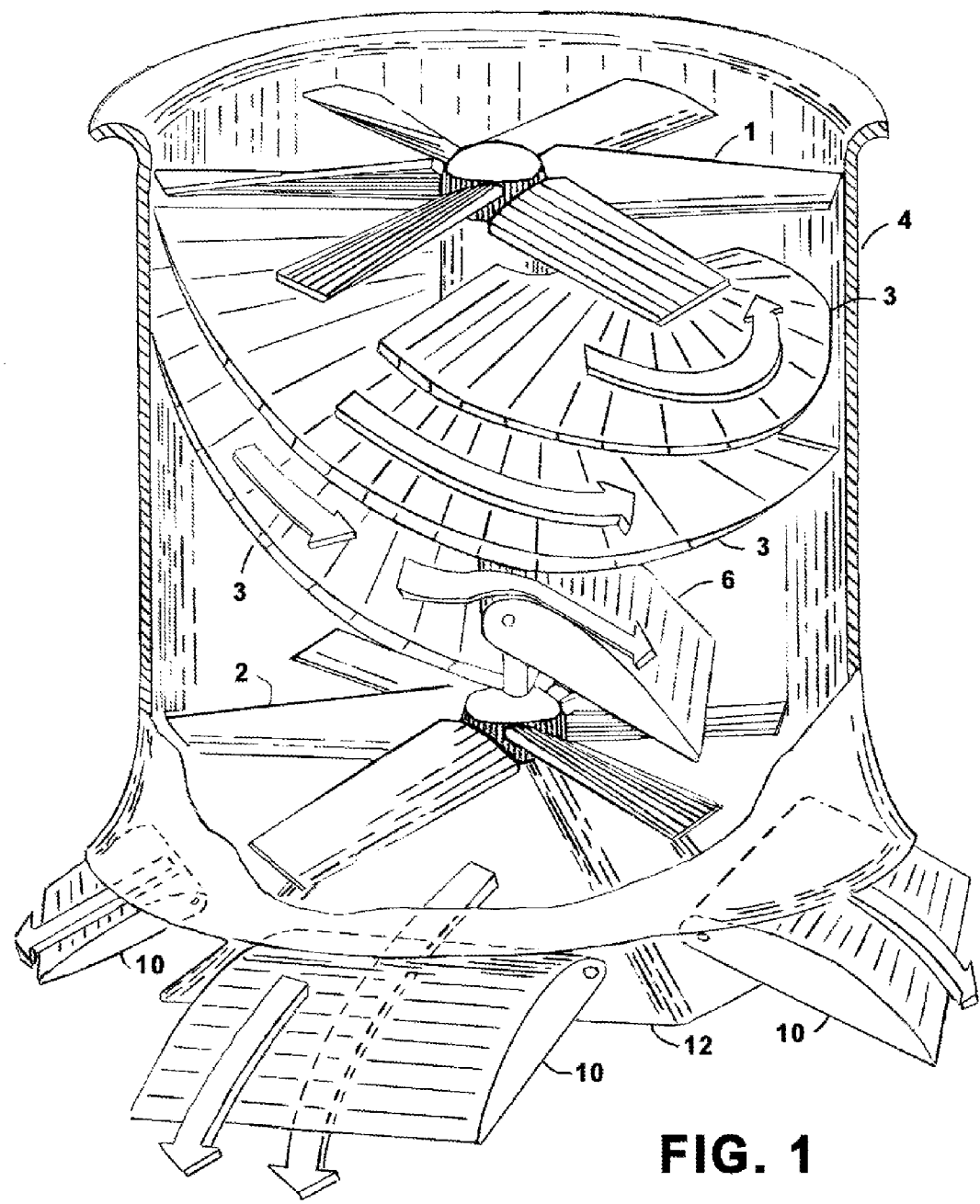
FIG. 1 is a cross-section side view of the device.
Figure 3:
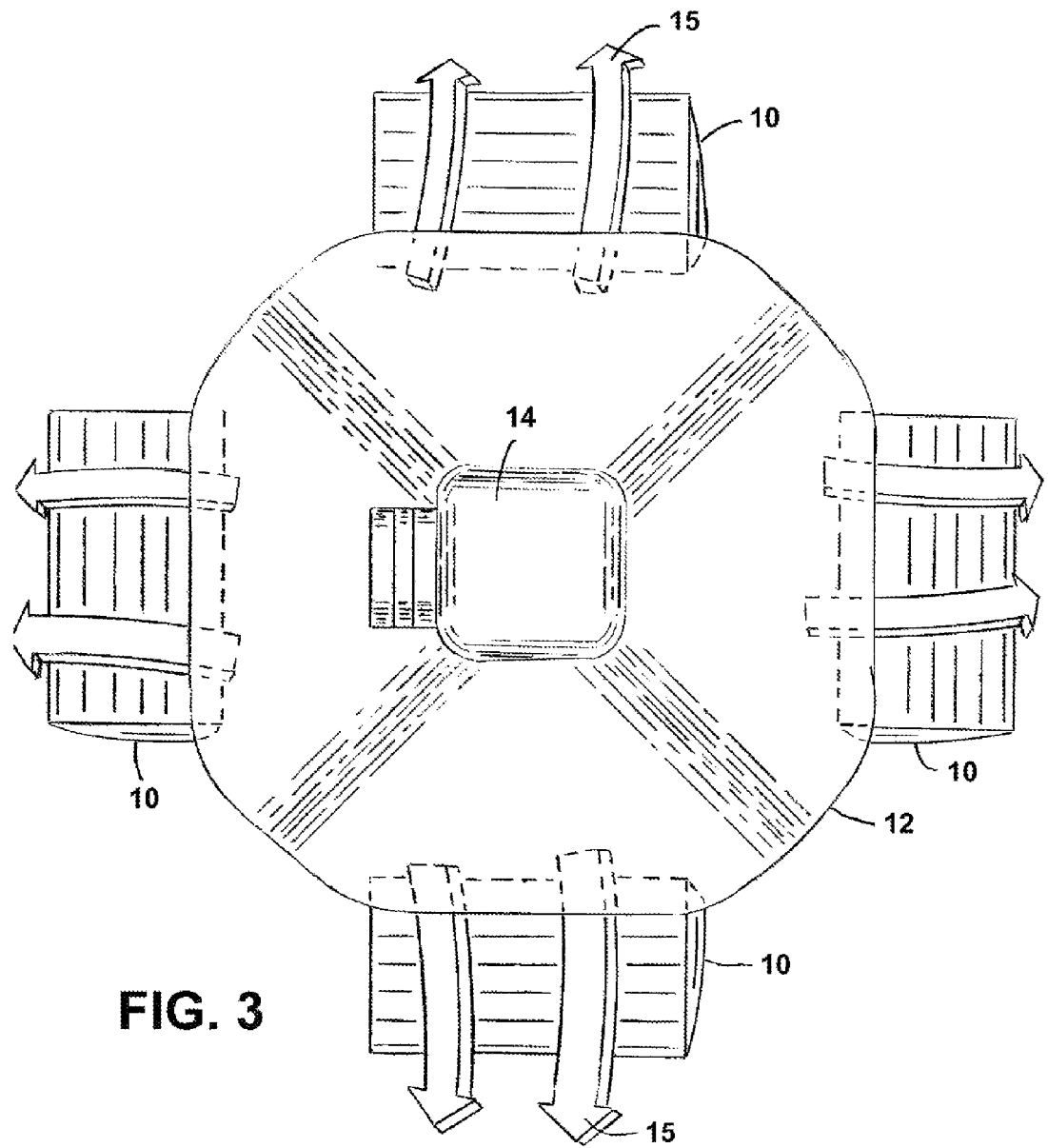
FIG. 3 is a bottom view of the device.

Referring to FIG. 1 and FIG. 3, two axial fans 1 and 2, are driven by a rotational power source 14 via two counter-rotating shafts. A hollow shaft drives exhaust fan 2 clockwise as viewed from the top. The intake fan 1 is driven by a solid shaft which rotates inside the hollow shaft and is rotating counter clockwise. There are other methods to counter-rotate the fans well know in the field. Different directional rotation of the two fans suppresses rotational tendencies of the device. The arrows 15 indicate airflow.

The rotational power source 14 show in FIG. 3 can be of several types such as electric motor, reciprocating or jet engines, hydraulic motors, and other rotational devices.

In FIG. 1, vanes 3 are attached and positioned in a downward spiral pattern, leading edges facing upward in close proximity to the bottom of the fan blades. In this embodiment, three vanes are placed equidistant around the circumference of the intake fan 1. The number of vanes could vary, depending on the size of the device. The outer edges of the vanes contact the inner wall of the cylindrical enclosure 4 and the inner edges contact the shaft enclosure.

The leading edges of the vanes 3 are angled upwardly to match the twist angle of the fan blades. This enables the efficient gathering of the airstream exiting the blades which naturally spirals downward at the fan blade angle.

In this embodiment, the three vanes are placed at three equidistant positions around the circumference of the fan, and each will capture one third of the fan generated airstream. Their spiral arrangement forms enclosed channels between them. The cross-sectional area of the channels are a fraction of the fan effective areas, which constricts and greatly accelerates the descending airstream. The lift of an airplane wing, which are airfoils, increases by the square of the airstream velocity. This makes the constriction very important, increasing lift exponentially. The exhaust fan 2 pulling the airstream downward, increases the volume and pressure capabilities of intake fan 1 to overcome any loss due to the constriction.

The channels terminate at the bottom edge of each vane. In FIG. 1 the leading edge of airfoil 6 faces into this channel and into the exiting high velocity airstream, creating vertical lift. Two additional airfoils, unseen in the illustration, are likewise facing into similar airstreams.

The airfoils and wings illustrated in FIG. 1, 2, 3 are of a basic airfoil design for clarity. The lift coefficient of these is about 1.5 but the addition of high-lift devices, such as slotted leading edges, Junker or Fowler flaps, vortex generators, and roller leading edges can increase lift coefficients to 3.5 and higher.

The slope of the spiral vane just above the upper airfoil 6 aids in maintaining boundary layer adhesion and prevents "stalling" at high angles-of-attack as does the downward pull on the airstream by the exhaust fan 2. If the vane section is too close to the airfoil, the low pressure above the airfoil places a downward pull on the vane, negating lift. Positioning the vane higher or slotting this portion of the vane to equalize pressure will prevent this.

An airstream will naturally flow to the outside of a curve due to centrifugal force. To retain equal flow across the airfoil's 6 leading edge, vertical baffles (not shown on the illustrations) will be placed on the surfaces of the spiral vanes to distribute the airstream evenly across the airfoil. Banking the spiral vanes toward the center will be beneficial, also.

Figure 2:
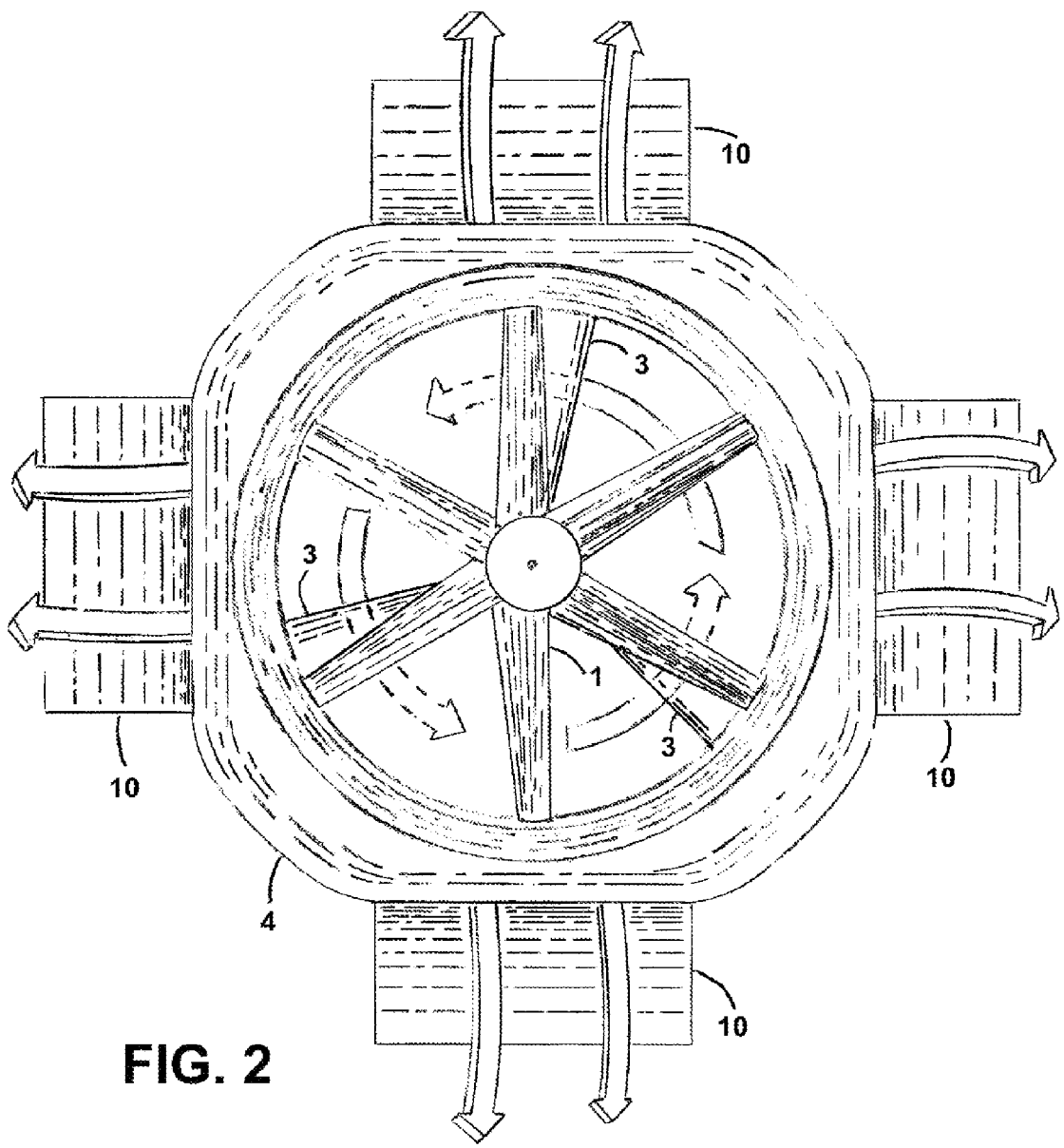
FIG. 2 is a top view of the device.

Referring to FIG. 1 and FIG. 2 at the level of the exhaust fan 2, the cylindrical enclosure flares outward to assume a "squared bell" shape. The lower edges curve out to become substantially horizontal. In FIG. 3, the flared inner skirt 12 matches the squared bell contours of the cylindrical enclosure 4 and is mounted directly beneath the exhaust fan 2, forming a substantially horizontal slotted annular opening between it and the enclosure 4. The exhaust fan 2 collects the descending airstream from the upper airfoils 6 which is diminished due to friction, parasitic and induced drag, reenergizes and forces it with renewed velocity and pressure down and out through the horizontal slot formed between the flared outer skirt of the cylindrical housing 4 and the flared lower skirt 12. Referring to FIG. 1 mounted in these openings are four annular wings 10, which are an airfoil design, leading edges facing inward into the exiting high velocity airstream, and creating vertical lift. These wings 10 are mounted via pivots in their leading edges. Their angles-of-attack are remotely adjustable by the pilot to vary their vertical lift, both individually and collectively. If more control is desired, the upper airfoils 6 can be pivoted and manipulated also. A less desirable method is to modulate airflow over the airfoils with movable and controllable vanes and baffles in the airstream.

Forward motion of the device is accomplished and controlled by selectively varying the angle-of-attack of the individual annular wings 10 which increases or decreases their vertical lift. A wing's decreased lift, for example, will tilt the device and, thus, move it in that direction though vectored thrust. A combination of lift variations allows the movement in any horizontal direction. Collective variation allows for vertical direction control.

Yaw control at low speeds or hovering is accomplished by varying one fan speed relative to the other or can also be performed by ducting a small portion of the high velocity air to pilot or controller activated nozzles mounted on the sides. At cruise speeds, a small external rudder will control yaw.

Multiples of the present invention can be mounted on a vehicle to achieve VOET flight, the number of which depending on the payload desired, be it cargo, military needs or commuter vehicles. Directional control, both vertically and horizontally, in this case, would be done by varying the relative lift of each device.

Electronic controllers well known in the field will stabilize the device by automatically varying lift of each wing or, in the case of multiple devices on an aircraft, varying the lift of each device.

The intake and exhaust fans 1, 2 are shown as axial types but propellers or centrifugal fans may be used instead. If fan 2 is a centrifugal impeller, it would be positioned adjacent to the wings 10. Another embodiment uses, in place of a fan, a jet engine using its exhaust to generate the airstream. However, cooling the exhaust is necessary to avoid damage to downstream components.

In cruise flight, the rush of ambient air past the intake of fan 1 could interfere with the efficiency of the fan. A cowling around the intake may be necessary to block or direct, with vanes, the ambient airstream into the fan input. A less preferred embodiment mounts one or more fans on the exterior of the cylindrical enclosure and directs a high velocity airstream laterally through an opening or openings in the cylindrical enclosure wall and into channels. The airstream then contacts the airfoils and wings, creating vertical lift in a manner as described previously.

It is intended that other variations and improvements which may be devised be considered as within the scope of this invention.

What is claimed is:

1. An apparatus for generating aerodynamic lift, comprising:
   a) a cylindrical enclosure having a substantially round upper section and an outwardly flared lower section;
   b) a first fan mounted in the substantially round upper section for moving an airstream within the cylindrical enclosure toward the outwardly flared lower section;
   c) a plurality of vanes for conducting the airstream, mounted under and adjacent to the first fan and equidistant around a circumference of the cylindrical enclosure in a spiral pattern, the plurality of vanes forming at least one enclosed channel;
   d) at least one airfoil mounted at an end of the at least one enclosed channel, having a leading edge facing into an end of the at least one enclosed channel and into the airstream;
   e) a second fan placed adjacent to the at least one airfoil for conducting the airstream within the cylindrical enclosure toward the outwardly flared lower section;
   f) a cone-shaped flared skirt placed beneath the second fan, the flared skirt and flared lower section of the cylindrical enclosure forming a substantially horizontal slot around the circumference of the cylindrical enclosure; and
   g) at least one annular wing mounted in the substantially horizontal slot, having a leading edge facing inwardly into the airstream.

2. The apparatus of claim 1, wherein an angle-of-attack of the at least one airfoil is adjustable.

3. The apparatus of claim 1, wherein an angle-of-attack of the at least one annular wing is adjustable.

4. The apparatus of claim 1, in which the first fan is an axial fan.

5. The apparatus of claim 1, in which the second fan is an axial fan.

6. The apparatus of claim 1, in which the first fan is a centrifugal impeller.

7. The apparatus of claim 1, in which the second fan is a centrifugal impeller.

8. The apparatus of claim 1, in which the outwardly flared lower section of the cylindrical enclosure is a squared bell shape.

9. The apparatus of claim 1, in which the conical flared skirt is a squared bell shape.

10. The apparatus of claim 1, in which the first fan is a jet engine, and the airstream is an exhaust from the jet engine.

11. The apparatus of claim 1, in which the plurality of vanes are slotted.

\* \* \* \* \*